United States Patent
Ruckh et al.

(10) Patent No.: US 8,967,626 B2
(45) Date of Patent: Mar. 3, 2015

(54) ARRANGEMENT AND METHOD FOR SEALING OFF A JOINT AREA BETWEEN A FIRST JOINT PARTNER AND A SECOND JOINT PARTNER

(75) Inventors: Martin Ruckh, Tuebingen (DE); Bernd Hierlemann, Kusterdingen (DE)

(73) Assignee: Robert Bosch GmbH, Stuttgart (DE)

( * ) Notice: Subject to any disclaimer, the term of this patent is extended or adjusted under 35 U.S.C. 154(b) by 8 days.

(21) Appl. No.: 13/515,016

(22) PCT Filed: Nov. 25, 2010

(86) PCT No.: PCT/EP2010/068166
§ 371 (c)(1),
(2), (4) Date: Sep. 17, 2012

(87) PCT Pub. No.: WO2011/069827
PCT Pub. Date: Jun. 16, 2011

(65) Prior Publication Data
US 2013/0020768 A1    Jan. 24, 2013

(30) Foreign Application Priority Data

Dec. 9, 2009  (DE) .......... 10 2009 047 706
Feb. 16, 2010  (DE) .......... 10 2010 001 979

(51) Int. Cl.
*F16L 17/00*    (2006.01)
*B60T 11/236*    (2006.01)
*F16J 15/06*    (2006.01)

(52) U.S. Cl.
CPC .............. *B60T 11/236* (2013.01); *F16J 15/064* (2013.01)
USPC ........... 277/314; 277/627; 277/644; 277/645

(58) Field of Classification Search
USPC ......... 277/312, 316, 605, 626–627, 607, 644, 277/645, 314
See application file for complete search history.

(56) References Cited

U.S. PATENT DOCUMENTS 2,631,871 A * 3/1953  Stone .................. 285/106
3,451,696 A * 6/1969  Hagelin et al. ........ 285/21.1

(Continued)

FOREIGN PATENT DOCUMENTS

DE    8805097    12/1988
DE    4336849    1/1995

(Continued)

OTHER PUBLICATIONS

PCT/EP2010/068166 International Search Report dated Jan. 26, 2011 (Translation and Original, 4 pages.

*Primary Examiner* — Vishal Patel
*Assistant Examiner* — L. Susmitha Koneru
(74) *Attorney, Agent, or Firm* — Michael Best & Friedrich LLP

(57) ABSTRACT

The invention relates to an arrangement (10) for sealing off a joint area (1) between a first joint partner (20, 200) and a second joint partner (30, 300) by means of at least one elastic sealing element (18, 180) disposed between a first sealing surface (12.1) of the first joint partner (20, 200) and a second sealing surface (12.2) of the second joint partner (30, 300), and an associated method for sealing off the joint area (1) between a first joint partner (20, 200) and a second joint partner (30, 300). According to the invention, at least one reservoir (14) for an anticorrosion agent (16) is introduced in a sealing zone (11) of the first and/or second sealing surface (12.1, 12.2), wherein the sealing element encloses the reservoir (14) together with the first and/or second sealing surface (12.1, 12.2).

22 Claims, 1 Drawing Sheet

(56) References Cited

U.S. PATENT DOCUMENTS

| | | | | |
|---|---|---|---|---|
| 3,623,851 | A * | 11/1971 | Konig et al. | 4/335 |
| 3,741,570 | A * | 6/1973 | Garrett | 277/625 |
| 3,915,480 | A * | 10/1975 | Kish et al. | 285/148.13 |
| 4,101,137 | A * | 7/1978 | Travis | 277/316 |
| 4,365,818 | A * | 12/1982 | Tolliver | 277/626 |
| 4,410,185 | A * | 10/1983 | Sporre | 277/314 |
| 4,817,963 | A * | 4/1989 | Munden et al. | 277/316 |
| 5,180,008 | A * | 1/1993 | Aldridge et al. | 277/322 |
| 5,246,236 | A * | 9/1993 | Szarka et al. | 277/337 |
| 5,427,386 | A * | 6/1995 | Breaker | 277/627 |
| 5,518,257 | A * | 5/1996 | Breaker | 277/612 |
| 5,580,068 | A * | 12/1996 | Gundy | 277/605 |
| 5,626,349 | A * | 5/1997 | Sutherland et al. | 277/605 |
| 5,687,997 | A * | 11/1997 | Beacom | 285/94 |
| 5,921,554 | A | 7/1999 | Derian et al. | |
| 6,264,092 | B1 * | 7/2001 | Yasuda et al. | 228/161 |
| 6,361,052 | B1 * | 3/2002 | Farinella | 277/611 |
| 6,491,468 | B1 * | 12/2002 | Hagen | 403/291 |
| 6,966,559 | B1 * | 11/2005 | Fischer et al. | 277/635 |
| 8,333,409 | B2 * | 12/2012 | Santi et al. | 285/96 |
| 8,408,557 | B2 * | 4/2013 | Taylor et al. | 277/626 |
| 2004/0201174 | A1 * | 10/2004 | Dodgson et al. | 277/316 |
| 2005/0184463 | A1 * | 8/2005 | Boutaghou et al. | 277/316 |
| 2008/0115772 | A1 | 5/2008 | Kuperus | |
| 2010/0187808 | A1 * | 7/2010 | Santi et al. | 285/106 |
| 2011/0008101 | A1 * | 1/2011 | Santi et al. | 403/288 |

FOREIGN PATENT DOCUMENTS

| | | |
|---|---|---|
| DE | 19534962 | 3/1997 |
| DE | 10130050 | 1/2003 |
| EP | 0887578 | 12/1998 |
| GB | 972309 | 10/1964 |
| JP | 2005331060 | 12/2005 |
| WO | 9729310 | 8/1997 |
| WO | 0244605 | 6/2002 |

* cited by examiner

ARRANGEMENT AND METHOD FOR SEALING OFF A JOINT AREA BETWEEN A FIRST JOINT PARTNER AND A SECOND JOINT PARTNER

BACKGROUND OF THE INVENTION

The invention relates to an arrangement for sealing off a joint area and to a method for sealing off a joint area.

An arrangement for sealing off a joint area between a first joint partner and a second joint partner is known from prior art, which, for example, joins a housing of a control unit and a fluid block of a fluid assembly of a vehicle brake system to one another by means of an elastomer seal. At least one elastic sealing element is thereby disposed between a first sealing surface of the first joint partner and a second sealing surface of the second joint partner and usually rests on an even sealing surface. After a certain amount of time under corrosive stress, infiltrations of salt and/or fluid deposits can occur at the interface between the joint partners, which can impair the operation of the control unit so that the specified requirements can partially no longer be fulfilled.

In the German patent publication DE 43 36 849 C1, a method for sealing off cable inlets from moisture and fluids as well as a corresponding cable inlet, respectively an insulation-displacement connector, is described. An inlet area is filled with a sealing gel at least in certain areas. In addition, provision is made for the components for bonding or closing the inlet area to be additionally provided at least in certain areas with a sealing grease, which in the contact location is pressed into cavities which cannot be reached by a gel.

SUMMARY OF THE INVENTION

The inventive arrangement for sealing a joint area has in contrast the advantage of at least one reservoir for an anticorrosion agent being configured in a sealing zone of a first sealing surface of a first joint partner and/or a second sealing surface of a second joint partner, wherein the sealing element encloses the reservoir together with the first and/or second sealing surface. The sealing element thereby rests at least in certain areas on the first and/or second sealing surface. Said sealing element is preferably subjected to force when being applied to said surfaces, wherein provision is made for said sealing element to be elastic and thus malleable. In total, provision is made for the sealing element for the first and/or second sealing surface to be disposed in such a way that a cavity is formed between said sealing element and the first and/or second sealing surface so as to enclose the same. The cavity formed is preferably configured to be contiguous and closed within the sealing zone and serves as a reservoir for accommodating the anticorrosion agent. The cavity formed or respectively the reservoir provided is preferably completely filled with the anticorrosion agent. The effect of the anticorrosion agent is preferably based on a hydrophobization of the surface area in order to repel aqueous media and/or corrosive vapors and thus to effectively counteract corrosion. Infiltrations of salt and or fluid deposits under the elastic sealing element into the inside of the joint partners can be avoided in an advantageous manner by means of the reservoir according to the invention.

The method according to the invention for sealing off a joint area between a first joint partner and a second joint partner has in contrast the advantage that at least one reservoir for an anticorrosion agent is set up in a sealing zone of the first and/or second joint partner, wherein the at least one reservoir is enclosed by the elastic sealing element and the first and/or second sealing surface. The reservoir is preferably introduced into a metal joint partner.

Embodiments of the present invention check the corrosion of the involved joint partners in an advantageous manner by introducing a suitable agent to the at least one reservoir and by filling said reservoir with the same. In a particular embodiment and arrangement of the reservoir, the contact pressing forces of the elastic sealing element can be increased in an advantageous manner. This especially takes place by means of one embodiment such that said sealing element is applied along the edge to configure the cavity provided as a reservoir. In a preferred embodiment this application of said sealing element takes place on a narrow contact width. It is particularly advantageous in this regard to provide for a bilateral application of said sealing element; thus enabling the reservoir for the anticorrosion agent to be configured between the two overlays of the sealing element and the first and/or second sealing surface. In addition, a capillary action between the elastic sealing element and the sealing surface is interrupted by the reservoir which was introduced and the expansion associated therewith so that the infiltration of the elastic sealing element by salt or respectively fluid deposits can be significantly reduced in an advantageous manner. The capillary action can further be reduced by the use of the anticorrosion agent, the effect of which is preferably based on a hydrophobization of the surface area in order to repel aqueous media and/or corrosive vapors. Moreover, the corrosive stress can be intercepted by the reservoir filled with the anticorrosion medium and a defined, passivated region can be produced, in which corrosion is prevented in an advantageous manner.

Embodiments of the present invention can, for example, be used in the case of joint partners which are highly subject to corrosion as, for example, where a control unit housing is connected to a fluid block of a fluid assembly, which are parts of a vehicle braking system, or where a control unit housing is connected to a servo motor in the case of power steering. Embodiments of the invention thereby prevent in an advantageous manner the infiltration of corrosive media into the at least one sealing element over the service life of the joint partners. In the case of two metal joint partners being joined, a reservoir filled with the anticorrosion medium can be introduced into each of the metal joining partners.

It is particularly advantageous that the geometry of the at least one reservoir is adapted to the application site and/or the elastic sealing element. Said at least one reservoir can thus, for example, be introduced into at least one metal joint part as a circumferential groove having rounded off edges, on which the elastic sealing element rests. Damage to the elastic sealing element can be avoided in an advantageous manner by rounding off the edges of the reservoir. The anticorrosion agent is particularly well protected within the groove which has been provided. Particularly by virtue of the fact that said groove is of rigid construction, it is not a concern that the anticorrosion agent will be pushed out of said groove by forces during operation. An escape of said agent through the metallic walls of the metal joint partner within the groove introduced into the same, for example, by means of diffusion is likewise prevented.

In an alternative embodiment, the at least one reservoir is introduced in a depression of the sealing element extending circumferentially within the sealing zone. The laterally protruding walls of the depression within the sealing element lie in a particularly advantageous manner as sealing lips on the first and/or second sealing surface. In so doing, large compressive forces are possible in the region of the sealing lips. In addition, the cavity forming the reservoir is already provided in the sealing element without increased manufacturing complexity and costs. A reservoir facing the first and/or second sealing surface can thereby be illustrated without any problems. Further adaptations to the first and/or second sealing surface, for example the introduction of a groove, can be omitted. In addition, the anticorrosion agent can be introduced in the elastic seal in a simple manner and be provided for processing.

When embodying the sealing off a joint area between the joint partners according to the invention, the at least one reservoir is filled with a liquid or viscous grease and/or oil, the effect of which preferably is based on a hydrophobization of the surface area in order to repel aqueous media and/or corrosive vapors and thus the capillary action or respectively the corrosive pressure can be intercepted.

In a further embodiment of the sealing off of a joint area between joint partners, a carrier impregnated with the anticorrosion agent, as, for example, a cord and/or felt band can be placed in the reservoir.

In a further embodiment of the sealing off of a joint area between joint partners according to the invention, the anticorrosion agent is selected in such a way that said agent evaporates when the hydrocarbons are heated up. The evaporated agent is held in the reservoir by the elastic sealing element and intercepts the capillary action or respectively the corrosive pressure.

BRIEF DESCRIPTION OF THE DRAWING

An exemplary embodiment of the invention is depicted in the drawing and is explained in detail in the following description.

DETAILED DESCRIPTION

Figure 1:
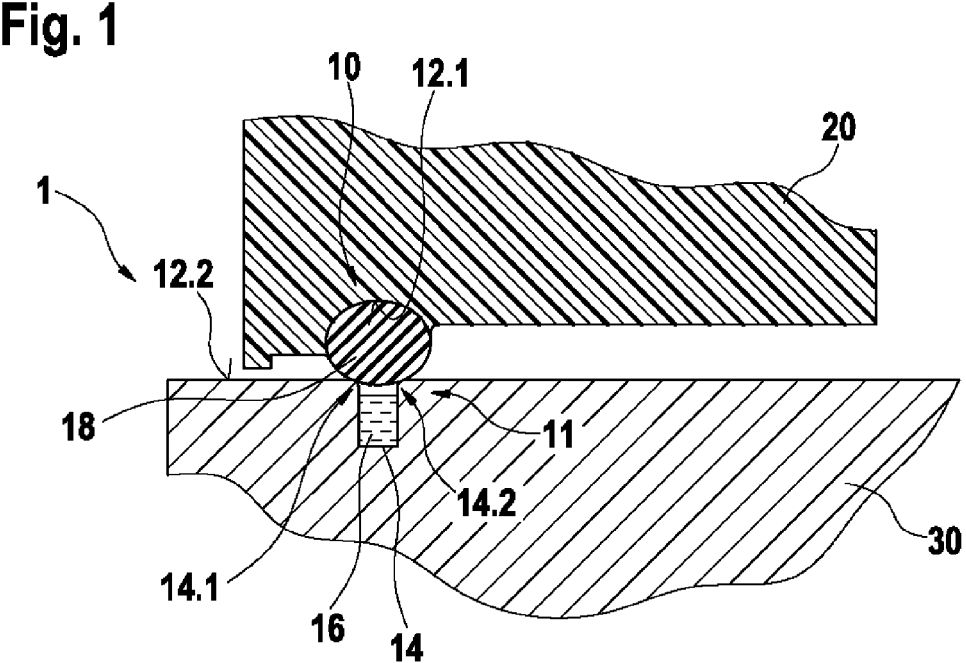
FIG. 1 shows a schematic cross sectional depiction of an exemplary embodiment of an arrangement for sealing off a joint area according to the invention.

As can be seen in FIG. 1, the depicted exemplary embodiment of the arrangement 10 according to the invention for sealing of a joint area 1 between a first joint partner 20 and a second joint partner 30 comprises at least one elastic sealing element 18, which is disposed between a first sealing surface 12.1 of the first joint partner 20 and a second sealing surface 12.2 of the second joint partner 30. In the exemplary embodiment shown, the first joint partner 20 is embodied as a plastic housing of a control unit and the second joint partner as a metal fluid block of a vehicle brake system. Embodiments can, of course, also be used for connections between two metal joint partners, wherein at least one reservoir containing an anticorrosion agent can then be introduced in one or both joint partners.

As can further be seen in FIG. 1, a reservoir 14 for an anticorrosion agent 16 is introduced in a sealing zone 11 of the second sealing surface 12.2. The effect of said anticorrosion agent is preferably based on a hydrophobization of the surface area in order to repel aqueous media and/or corrosive vapors and thus to effectively counter corrosion. In so doing, the geometry of the reservoir 14 is adapted to the application site and/or the sealing element 18 in such a way that said sealing element 18 seals off said reservoir 14 in order to prevent the anticorrosion agent 16 which was filled into said reservoir 14 from volatilizing. In the exemplary embodiment depicted, said reservoir 14 is introduced in the metal second joint partner 30, which is embodied as a fluid block, in the form of a milled circumferential groove with rounded edges 14.1, 14.2. The elastic sealing element 18 rests on the rounded edges 14.1, 14.2 and seals of said reservoir 14 which is configured as a groove. In so doing, the rounded edges 14.1, 14.2 of said reservoir 14 configured as a groove prevent damage to said elastic sealing element 18. Infiltrations of salt or fluid deposits beneath said elastic sealing element 18 into the interior of the first joint partner 20, which is embodied as a control unit housing, can be avoided in an advantageous manner; thus enabling corrosion to the joint partners 20, 30 involved to be checked and/or completely avoided. The compressive forces of said elastic sealing element 18 can be increased by the arrangement of said elastic sealing element 18 on the edges 14.1, 14.2 of said reservoir. In addition, a capillary action between said sealing element 18 and the second sealing surface 12.2 is interrupted by the introduction of said reservoir 14 and the expansion associated therewith; thus enabling the infiltration of said elastic sealing element 18 by salt or fluid deposits to be significantly reduced in an advantageous manner. The capillary action can further be reduced by the use of an anticorrosion agent 16, the effect of which is preferably based on a hydrophobization of the surface area. By means of said reservoir 14 filled with the anticorrosion agent 16, the corrosive pressure can be intercepted and a defined, passivated region can be produced, in which corrosion is prevented in an advantageous manner.

Figure 2:
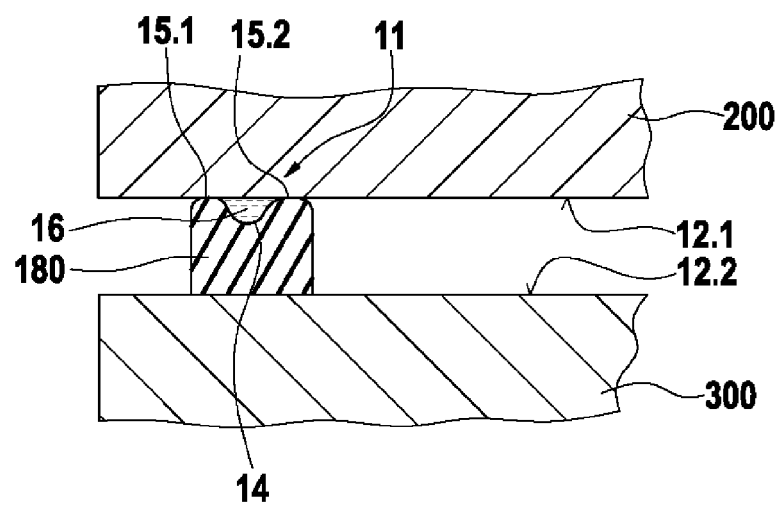
FIG. 2 shows a schematic cross sectional depiction of another embodiment of an arrangement for sealing off a joint area.

FIG. 2 shows an alternative embodiment of the invention. In contrast to the embodiment according to FIG. 1, a groove is not provided in any of the joint partners 200 and 300 arranged for sealing off a joint area. The sealing surfaces 12.1 and/or 12.2 are in fact planarly designed, in particular in a region of the sealing zone 11. The groove in the preferably metal joint partner 200 and/or 300 described in the first embodiment is thereby omitted in an advantageous manner. Instead of that, at least one reservoir 14 is introduced in a depression of the sealing element 180 running circumferentially within the sealing zone 11, wherein laterally protruding walls of the depression rest as sealing lips 15.1 and 15.2 on the first and/or second sealing surface 12.1, 12.2. By means of the snug full surface contacts of the sealing lips 15.1 and 15.2, the maintenance of a required sealing force in the sealing zone 11 is well ensured. The sealing element 180 is preferably configured with the groove on one side and tightly connected to the second joint partner 300 on the side facing away from the groove, for example, by means of bonding or molding. For this purpose, the second joint partner 300 can also have a depression, in which the seal 180 can be disposed so as to be axially positioned on the sealing surface 12.2. It is also optionally possible to embody the seal with more than two sealing lips, wherein all of the sealing lips then ideally rest on the sealing surface 12.1 of the first joint partner while being subjected to the action of force. In so doing, a plurality of reservoirs 14 are then formed on the side of said sealing lips, whereby at least one of the reservoirs formed is preferably completely filled with an anticorrosion agent 16. Likewise at least one groove can be provided in each case on both sides of the seal 180; thus enabling at least two sealing lips 15.1 and 15.2 to rest upon the first sealing surface 12.1 of the first joint partner 200 as well as on the second sealing surface 12.2 of the second joint partner 200 and consequently form in each case a sealing zone 11 with respect to the joint partners 200, 300. A groove additionally provided in the sealing zone 11 in the first joint partner 200 and/or second joint partner 300 can serve as a positioning aid when inserting the sealing element 180.

The reservoir 14 can be filled, for example, with liquid and/or viscous greases and/or oils as an anticorrosion agent. In an alternative embodiment which is not shown, a carrier impregnated with the anticorrosion agent as, for example, a cord or a piece of felt can be placed into the reservoir. The anticorrosion agent 16 is preferably selected in such a way that it evaporates hydrocarbons when heated. The evaporated hydrocarbons are held by the elastic sealing element 18, 180 in the reservoir and intercept the capillary action or respectively the corrosive pressure.

According to the corresponding method according to the invention for sealing off a joint area 1 between the first joint partner 20, 200 and the second joint partner 30, 300 with at least one elastic sealing element 18, at least one reservoir 14 for an anticorrosion agent 16 is created, the effect of which is preferably based on a hydrophobization of the surface area in order to repel aqueous media and/or corrosive vapors, wherein the at least one reservoir 14 is enclosed by the elastic sealing element 18, 180 and the first and/or second sealing surface 12.1, 12.2.

Embodiments of the invention provide in an advantageous manner for a corrosion retardant to prevent corrosive infiltrations in joint partners. Corrosion is retarded in various ways by the introduction and filling of the reservoir with suitable materials. The compressive forces of the elastic sealing element are thus increased in an advantageous manner on both edges of said reservoir. The capillary action is interrupted by expansion, aqueous media and/or corrosive vapors are repelled by the hydrophobization of the surface area of the anticorrosion agent and the corrosive pressure is intercepted in said defined, passivated reservoir. In so doing, infiltrations of salt or fluid deposits beneath the elastic sealing element into the interior of the control unit and an impairment of the operations of said control unit over the service life thereof are thereby prevented.

What is claimed is:

1. A method for sealing off a joint area between a first joint partner (20) and a second joint partner (30), between which at least one elastic sealing element (18) is disposed, the method comprising:
    forming at least one reservoir (14) for an anticorrosion agent (16) into a sealing surface (12.2) of the second joint partner (30);
    closing the at least one reservoir (14) with the elastic sealing element (18) by static pressing forces between a sealing surface (12.1) of the first joint partner (20) and the sealing surface (12.2) of the second joint partner (30); and
    applying heat to the anticorrosion agent such that it evaporates hydrocarbons.

2. The method according to claim 1, characterized in that the reservoir (14) is filled with at least one of a liquid, viscous grease and oil as an anticorrosion agent (16).

3. The method according to claim 1, characterized in that a carrier impregnated with the anticorrosion agent (16) is placed in said reservoir (14).

4. An arrangement, comprising:
    a first joint partner (20);
    a second joint partner (30), the first joint partner (20) and the second joint partner (30) defining a joint area therebetween;
    at least one elastic sealing element (18), which is disposed between a first sealing surface (12.1) of the first joint partner (20) and a second sealing surface (12.2) of the second joint partner (30); and
    at least one reservoir (14) having an anticorrosion agent (16) that is formed as a groove in the second sealing surface (12.2), wherein
    the sealing element (18) is fixed to the first joint partner (20) and extends over and closes the groove.

5. The arrangement according to claim 4, characterized in that the at least one reservoir (14) is filled with at least one of a liquid, viscous grease and oil as an anticorrosion agent (16).

6. The arrangement according to claim 4, characterized in that a carrier impregnated with the anticorrosion agent (16) is placed in the at least one reservoir (14).

7. The arrangement according to claim 4, characterized in that the groove includes rounded edges (14.1, 14.2), on which the elastic sealing element (18) rests.

8. The arrangement according to claim 4, characterized in that the first sealing surface (12.1) includes a step portion that projects towards the second sealing surface (12.2).

9. The arrangement according to claim 4, characterized in that the first sealing surface (12.1) includes a depression that receives a portion of the sealing element (18).

10. An arrangement, comprising:
    a first joint partner (20);
    a second joint partner (30), the first joint partner (20) and the second joint partner (30) defining a joint area therebetween;
    at least one elastic sealing element (18), which is disposed between a first sealing surface (12.1) of the first joint partner (20) and a second sealing surface (12.2) of the second joint partner (30); and
    at least one reservoir (14) having an anticorrosion agent (16) that is formed in the second sealing surface (12.2), wherein
    the sealing element (18) extends over and closes the reservoir (14).

11. The arrangement according to claim 10, characterized in that the first sealing surface (12.1) includes a step portion that projects towards the second sealing surface (12.2).

12. The arrangement according to claim 10, characterized in that the first sealing surface (12.1) includes a depression that receives a portion of the sealing element (18).

13. The arrangement according to claim 10, characterized in that the at least one reservoir (14) is filled with at least one of a liquid, viscous grease and oil as an anticorrosion agent (16).

14. The arrangement according to claim 10, characterized in that a carrier impregnated with the anticorrosion agent (16) is placed in the at least one reservoir (14).

15. The arrangement of claim 10, wherein the first joint partner (20) is formed as a plastic housing of a control unit.

16. The arrangement of claim 15, wherein the second joint partner (30) is formed as a metal fluid block.

17. The method of claim 1, wherein the first joint partner (20) is a plastic housing of a control unit and the second joint partner (30) is a metal fluid block.

18. The arrangement of claim 4, wherein the first joint partner (20) is formed as a plastic housing of a control unit.

19. The arrangement of claim 18, wherein the second joint partner (30) is formed as a metal fluid block.

20. The method of claim 1, wherein the at least one elastic sealing element (18) is an elastomer.

21. The arrangement of claim 4, wherein the at least one elastic sealing element (18) is an elastomer.

22. The arrangement of claim 10, wherein the at least one elastic sealing element (18) is an elastomer.

* * * * *